(12) United States Patent
Guénot

(10) Patent No.: US 12,710,359 B2
(45) Date of Patent: Aug. 18, 2026

(54) OPTICAL SPECTROMETER AND A METHOD FOR SPECTRALLY RESOLVED TWO-DIMENSIONAL IMAGING OF AN OBJECT

(71) Applicant: Mantis Photonics AB, Lund (SE)

(72) Inventor: Diego Guénot, Lund (SE)

(73) Assignee: Mantis Photonics AB, Lund (SE)

( * ) Notice: Subject to any disclaimer, the term of this patent is extended or adjusted under 35 U.S.C. 154(b) by 88 days.

(21) Appl. No.: 18/728,103

(22) PCT Filed: Jan. 17, 2023

(86) PCT No.: PCT/SE2023/050043
§ 371 (c)(1),
(2) Date: Jul. 11, 2024

(87) PCT Pub. No.: WO2023/140771
PCT Pub. Date: Jul. 27, 2023

(65) Prior Publication Data

US 2025/0060309 A1 Feb. 20, 2025

(30) Foreign Application Priority Data

Jan. 19, 2022 (SE) .................................... 2250040-9

(51) Int. Cl.
*G01N 21/31* (2006.01)

(52) U.S. Cl.
CPC ..... *G01N 21/31* (2013.01); *G01N 2201/0633* (2013.01); *G01N 2201/0635* (2013.01)

(58) Field of Classification Search
CPC .. G01N 21/65; G01N 21/255; G01N 21/8507; G01N 2201/0221;
(Continued)

(56) References Cited

U.S. PATENT DOCUMENTS 5,982,497 A * 11/1999 Hopkins ................. G01J 3/513 250/226
7,283,232 B2 * 10/2007 Brady ....................... G01J 3/36 356/326
2006/0274308 A1 12/2006 Brady et al.

FOREIGN PATENT DOCUMENTS

CN 107271039 B * 4/2019 ............ G01J 3/2823
CN 109708755 A 5/2019
(Continued)

OTHER PUBLICATIONS

International Search Report and Written Opinion mailed Mar. 7, 2023; International Patent Application No. PCT/SE2023/050043 filed Jan. 17, 2023. ISA/SE; 6 pages.

*Primary Examiner* — Michael P Stafira
(74) *Attorney, Agent, or Firm* — McDonald Hopkins LLC

(57) ABSTRACT

The disclosure relates to a lens assembly for collimating incoming radiation from an object arranged along an optical axis, comprising: a first lens arranged on the optical axis of the lens assembly; a second lens arranged on the optical axis of the lens assembly; a light filter comprising a non-transparent sheet body with at least one hole; wherein the light filter is arranged: between the first lens and the second lens; in the focal point of the first lens and the second lens; and so that the at least one hole is close to or at the optical axis of the lens assembly. The disclosure further relates to an optical spectrometer for spectrally resolved two-dimensional imaging of an object and a method for spectrally resolved two-dimensional imaging of an object.

10 Claims, 3 Drawing Sheets

(58) Field of Classification Search

CPC ....... G01N 21/6456; G01N 2021/6423; G01N 2021/6417; G01N 21/31; G01N 2021/6471; G01N 2201/0627; G01N 21/01; G01N 21/25; G01N 2021/3166; G01N 21/0303; G01N 21/314; G01N 21/3504; G01N 21/61; G01N 21/64; G01N 33/004; G01N 33/497; G01N 21/4795; G01N 2201/0633; G01N 21/274; G01N 2201/0635; G01N 2201/068; G01N 2223/076; G01N 2223/1016; G01N 23/2209; G01N 33/48; G01N 2021/3531; G01N 21/4738; G01N 21/645; G01N 2201/0634; G01N 2021/216; G01N 2021/6421; G01N 21/251; G01N 21/359; G01N 21/71; G01N 21/85; G01N 2201/061; G01N 2201/062; G01N 2201/0638; G01N 2201/0846; G01N 2223/041; G01N 2223/0568; G01N 2223/316; G01N 2223/32; G01N 2223/50; G01N 2223/652; G01N 23/085; G01N 23/20008; G01N 23/2076; G01N 33/492; G01N 15/0211; G01N 15/14; G01N 15/1433; G01N 15/1434; G01N 2015/1447; G01N 2021/036; G01N 2021/0389; G01N 2021/317; G01N 2021/3174; G01N 2021/651; G01N 2021/656; G01N 21/4788; G01N 21/51; G01N 21/62; G01N 21/6486; G01N 2223/501; G01N 2223/6116; G01N 23/2204; G01N 23/223; G01N 23/2254; G01N 2021/3155; G01N 2021/6463; G01N 2021/6482; G01N 21/21; G01N 21/33; G01N 21/35; G01N 21/45; G01N 21/6452; G01N 21/6458; G01N 21/73; G01N 2201/0612; G01N 2201/0636; G01N 2201/1296

See application file for complete search history.

(56) References Cited

FOREIGN PATENT DOCUMENTS

| | | | | | |
|---|---|---|---|---|---|
| CN | 109839190 | A | * | 6/2019 | |
| CN | 117268541 | A | * | 12/2023 | ............ G01J 3/2823 |
| JP | 3429589 | B2 | * | 7/2003 | |
| WO | 9902950 | A1 | | 1/1999 | |
| WO | WO-2010053979 | A2 | * | 5/2010 | ................ G01J 3/36 |
| WO | 2020263161 | A1 | | 12/2020 | |

* cited by examiner

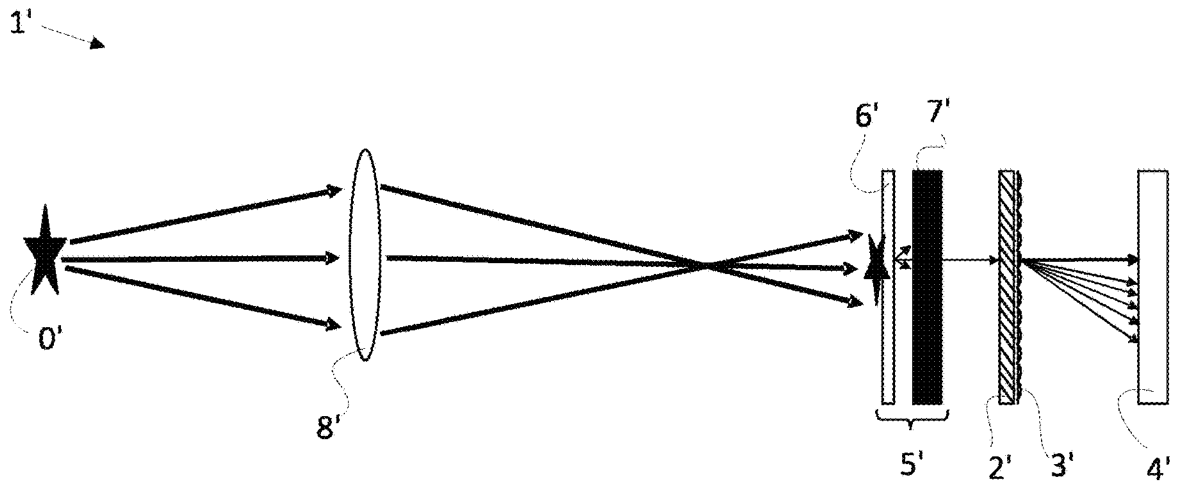
*Figure 1a – Prior art*
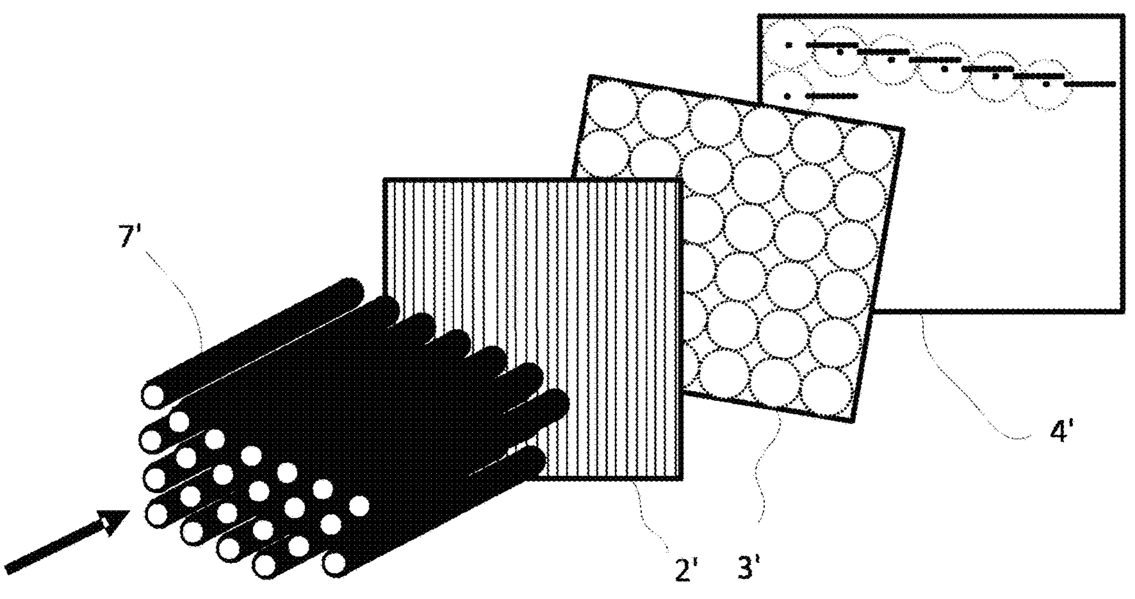
*Figure 1b – Prior art*

OPTICAL SPECTROMETER AND A METHOD FOR SPECTRALLY RESOLVED TWO-DIMENSIONAL IMAGING OF AN OBJECT

CROSS-REFERENCE TO RELATED APPLICATION

This application is a 35 U.S.C. § 371 national stage application of PCT Application No. PCT/SE2023/050043 filed on Jan. 17, 2023, entitled "AN OPTICAL SPECTROMETER AND A METHOD FOR SPECTRALLY RESOLVED TWO-DIMENSIONAL IMAGING OF AN OBJECT," which claims priority to Swedish Patent Application No. 2250040-9 filed on Jan. 19, 2022, each of which are incorporated herein in their entirety by reference.

TECHNICAL FIELD

The present disclosure relates to a lens assembly for collimating incoming radiation from an object arranged along an optical axis, an optical spectrometer for spectrally resolved two-dimensional imaging of an object and a method for spectrally resolved two-dimensional imaging of an object. More specifically, the disclosure relates to a lens assembly for collimating incoming radiation from an object arranged along an optical axis, an optical spectrometer for spectrally resolved two-dimensional imaging of an object and a method for spectrally resolved two-dimensional imaging of an object as defined in the introductory parts of the independent claims.

BACKGROUND ART

Spectrometers are used for many purposes such as sensors in industrial processes, satellite imaging, environmental studies and laboratory research.

Spectrometers collects radiation and divides it into its spectral components that is characteristic for the object emitting, absorbing or scattering the radiation. These instruments generally include some type of spectrally selective element to separate wavelengths of radiation received from the object, and an optical element to focus or concentrate the radiation onto a sensor array. Prior art spectrometers do, however, have some problems. Prior art spectrometers able to measure with high resolution are often larger than what is practical for use in many portable applications. The cost of prior spectrometers can also be greater than what is acceptable for the application.

In some applications, it is desired to record spectroscopic information in two dimensions to map spectroscopic data of an object resolved in two dimensions. For that purpose imaging spectrometers have been developed to map spectroscopic data in a grid, much like an ordinary image where each pixel includes spectroscopic data. These imaging spectrometers, also called hyperspectral cameras, however, have several issues.

They often require a scanning technology, meaning that an element must scan the image point-by-point or line-by-line. This scanning requires complex mechanics and the scanning takes at least some tens of milliseconds, which makes them inappropriate for imaging objects with quickly evolving dynamic or in rough environments. The complex mechanics for scanning is expensive and sensitive to movement during imaging making the spectrometer expensive and fragile.

Some imaging spectrometers have cameras, which are able to record the spectrum of a 2D image in a single acquisition, e.g. snapshot hyperspectral cameras, removing the need of scanning mechanics. These cameras, however, use special absorption filters with limited spatial and spectral resolution and they are expensive.

One solution was introduced in the patent document PCT/SE2020/050637. The collimating arrangement disclosed in PCT/SE2020/050637 and shown in FIG. 1*a* and FIG. 1*b* of this application solves a problem of previous trials with this type of spectrometer that the pattern spectra from the multi-lens array arrangement is inferred on the two-dimensional detector. When using only collimated light, the signal strength is reduced significantly, the signal may be reduced by as much as 99.9%, but the problem with inferred light is overcome as the radiation reaching the multi-lens array arrangement will be collimated so that each pixel will reflect a pixel in an image of the imaged object.

However, the setup disclosed in PCT/SE2020/050637 is expensive, and require carful alignment of the micro-channel component.

There is thus a need in the industry for an improved imaging spectrometer with high spatial resolution able to make a quick measurement without scanning technology, while being small, rugged and low in cost.

SUMMARY

It is an object of the present disclosure to mitigate, alleviate or eliminate one or more of the above-identified deficiencies and disadvantages in the prior art and solve at least the above mentioned problem. According to a first aspect there is provided a lens assembly for collimating incoming radiation from an object arranged along an optical axis, comprising: a first lens arranged on the optical axis of the lens assembly; a second lens arranged on the optical axis of the lens assembly; a light filter comprising a non-transparent sheet body with at least one hole; wherein the light filter is arranged: between the first lens and the second lens; in the focal point of the first lens and the second lens; and so that the at least one hole is close to or at the optical axis of the lens assembly.

The disclosed lens assembly has a number of advantages over the prior art. The lens assembly is a lot cheaper and easier to manufacture than previous collimating arrangements with micro channel components. There is further no need to align the now removed micro channel component making alignment a lot easier. A higher transmission with at least a factor two is also achieved. The lens assembly further does the imaging simplifying the setup considerably. Still further the herein disclosed lens assembly can be used to select something else than the collimated light not possible with the prior art solution.

According to some embodiments, the lens comprises a third lens placed on the optical axis before the first lens arranged to image an object in the focal spot of the first lens. This creates an intermediate image of the object before the first lens such that the intermediate image may be imaged onto components after the lens assembly along the optical axis.

According to a further embodiment a diffuser can be placed at the position of the intermediate image. This is advantageous when using a collimated light source such as a laser.

According to some embodiments, the light filter has a ring opening, i.e. a hole with a blocked center part. This enable the possibility to image only scatted light from an imaged object or sample. An axicon lens can further be placed after the light filter to improve the subsequent handling of the imaging.

According to some embodiments, the light filter has a first hole and a second hole close to the focal points of the first lens and the second lens, wherein the first hole hosts a first polarization filter and the second hole hosts a second polarization filter; wherein the direction of the first polarization filter and the second polarization filter are not equally aligned. The polarization should select 2 different polarizations, either horizontal and vertical, or circular left and circular right. The polarization of the radiation from the object is thereby resolved in the collimated light exiting the lens assembly.

The first hole and the second hole in the filter is according to a further embodiment place perpendicularly to the dispersion direction of the grating. This ensures that the spectrum from both polarization do not overlap.

According to some embodiments, the first lens, the second lens or the third lens are of a type comprised in the group of: a simple lens, an achromatic doublet lens, an aspherical lens and a focusing lens assembly.

According to a second aspect there is provided an optical spectrometer for spectrally resolved two-dimensional imaging of an object, comprising the lens assembly according to the first aspect, wherein the optical spectrometer further comprises: a dispersing device placed after the lens assembly on the optical axis; a multi-lens array arrangement arranged to receive the dispersed radiation from the dispersing device; and a two-dimensional detector arranged to receive the dispersed radiation as directed by the multi-lens array arrangement The disclosed optical spectrometer has a number of advantages over the prior art. The optical spectrometer is a lot cheaper and easier to manufacture than previous collimating arrangements with micro channel components. There is further no need to align the now removed micro channel component making alignment a lot easier. A higher transmission with at least a factor two is also achieved. The optical spectrometer further does the imaging simplifying the setup considerably. Still further the herein disclosed optical spectrometer can be used to select something else than the collimated light not possible with the prior art solution.

According to some embodiments, the dispersing device is a component comprised in the group consisting of a transmission grating, a holographic grating only transmitting the first diffraction order, and a prism. The important feature is that the dispersing device diffract the radiation in its spectral components.

According to some embodiments, the hole size of the light filter is such that the transmitted light is collimated within less than 10 milliradian. The hole size of the light filter is such that the transmitted light is collimated within a few milliradian. This collimation is required so that the focus of each microlens is not significantly increased with respect to the focus of the same microlens illuminated by perfectly collimated light. For example a 100 micrometer (μm) lens of 1 millimeter (mm) focal length can focus down to 6.5 μm or 6.5 milliradian FWHM. Therefore the lens filter should filter to less than 6.5 milliradian in order not to affect the microlens focal spot size. For example if the lens 1 and 2 have a focal length of 5 cm then the hole diameter should be of less than 325 μm. This will facilitate a good imaging by the multi-lens assembly.

According to some embodiments, the dispersing device and multi-lens array arrangement are arranged directly adjacent or abutting to the second lens to avoid aberrations such as barrel distortion pixel cross-talk etc.

According to some embodiments, the lens diameter of the second lens is at least as large as the diameter of the detecting surface of the two-dimensional detector to optimize sensitivity of the optical spectrometer.

According to some embodiments, the lens assembly is placed at an angle with respect the dispersing device and two-dimensional detector. This allows the use of gratings with more lines per mm.

According to some embodiments, the dispersing device is combined with a prism or micro prism array to from a grism in order to increase the spectral resolution.

According to some embodiments, the two-dimensional detector is a CCD array, CMOS or InGaAs, depending on the wavelength range of the spectrometer.

According to a third aspect there is provided a method for spectrally resolved two-dimensional imaging of an object, comprising the step of: dispersing radiation from object by a dispersing device, receiving the dispersed radiation from the dispersing device at a multi-lens array arrangement arranged to, receiving the dispersed radiation as directed by the multi-lens array arrangement at a two-dimensional detector, wherein method further comprises the steps of collimating the radiation from object before the radiation reaches the dispersing device by a lens assembly according to the first aspect.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

FIG. 1*a* shows a schematic view of an optical spectrometer according to the prior art.

FIG. 1*b* is a perspective view of parts the prior art setup in FIG. 1*a*.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

FIG. 1*a* and FIG. 1*b* disclose an optical spectrometer according to the prior art for spectrally resolved two-dimensional imaging of an object 0'. A lens 8' images the radiation from the object 0' onto a collimating arrangement 5' for collimating the radiation from object 0' before the radiation continues to a dispersing device 2'. The collimating arrangement 5' comprises a diffusing plate 6' for diffusing the radiation and an optical micro-channel component 7' arranged to receive the diffused radiation. The optical micro-channel component 7' comprises a plurality of parallel and linear optical micro-channels directed towards the dispersing device 2'. Only radiation traveling in the direction of the parallel linear optical micro-channels will pass the optical micro-channel component 7'. The radiation will thus be parallel and collimated after the optical micro-channel component 7'. The collimated radiation will thereafter arrive at the dispersing device 2' arranged to disperse the radiation. The dispersed radiation continues to a multi-lens array arrangement 3' arranged to receive the dispersed radiation from the dispersing device 2'. A two-dimensional detector 4' is arranged to receive the dispersed radiation as directed by the multi-lens array arrangement 3'. The disclosed lens assembly has a number of advantages over the prior art. The lens assembly is a lot cheaper and easier to manufacture than previous collimating arrangements with micro channel components. There is further no need to align the now removed micro channel component making alignment a lot easier. A higher transmission with at least a factor two is also achieved. The lens assembly further does the imaging simplifying the setup considerably. Still further the herein disclosed lens assembly can be used to select something else than the collimated light not possible with the prior art solution.

Figure 2:
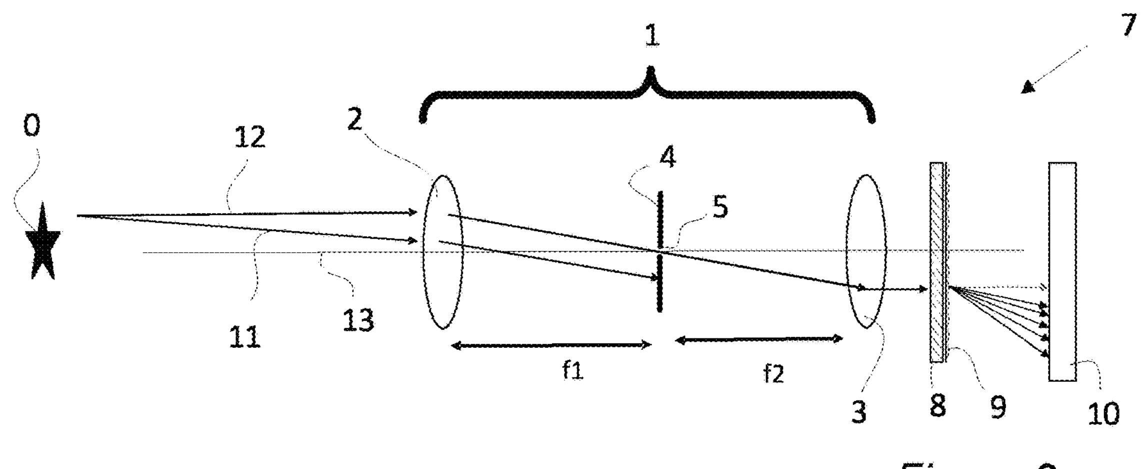
FIG. 2 shows a schematic view of an optical spectrometer for spectrally resolved two-dimensional imaging of an object including the novel lens assembly.

FIG. 2 discloses the first aspect of this disclosure shows a lens assembly 1 for collimating incoming radiation 11,12 from an object 0 arranged along an optical axis, comprising: a first lens arranged 2 on the optical axis 13 of the lens assembly 1; a second lens 3 arranged on the optical axis of the lens assembly 1; a light filter 4 comprising a non-transparent sheet body with at least one hole 5; wherein the light filter 4 is arranged: between the first lens 2 and the second lens 3; in the focal point of the first lens 2 and the second lens 3; and so that the at least one hole 5 is close to or at the optical axis 13 of the lens assembly 1. The light filter facilitate so that only collimated light is collected after the lens assembly.

Figure 3:
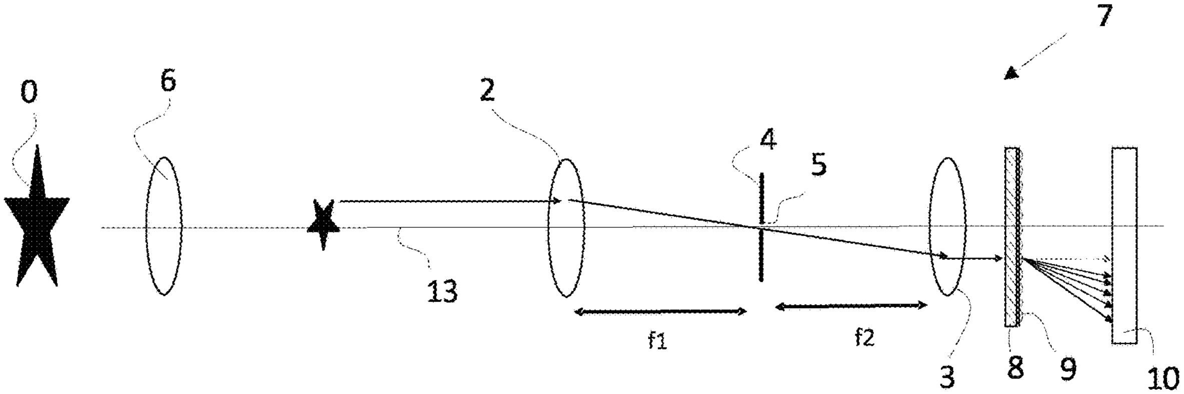
FIG. 3 shows a modified embodiment of the optical spectrometer of FIG. 2 where a third lens is introduced before the first lens.

FIG. 3 discloses a further embodiment of the present disclosure where the lens assembly comprises a third lens 6 placed on the optical axis 13 before the first lens 2 arranged to image an object in the focal spot of the first lens. An intermediate image of the object is created before the first lens such that the intermediate image may be imaged onto a dispersing device 8 after the lens assembly 1 along the optical axis.

Figure 4:
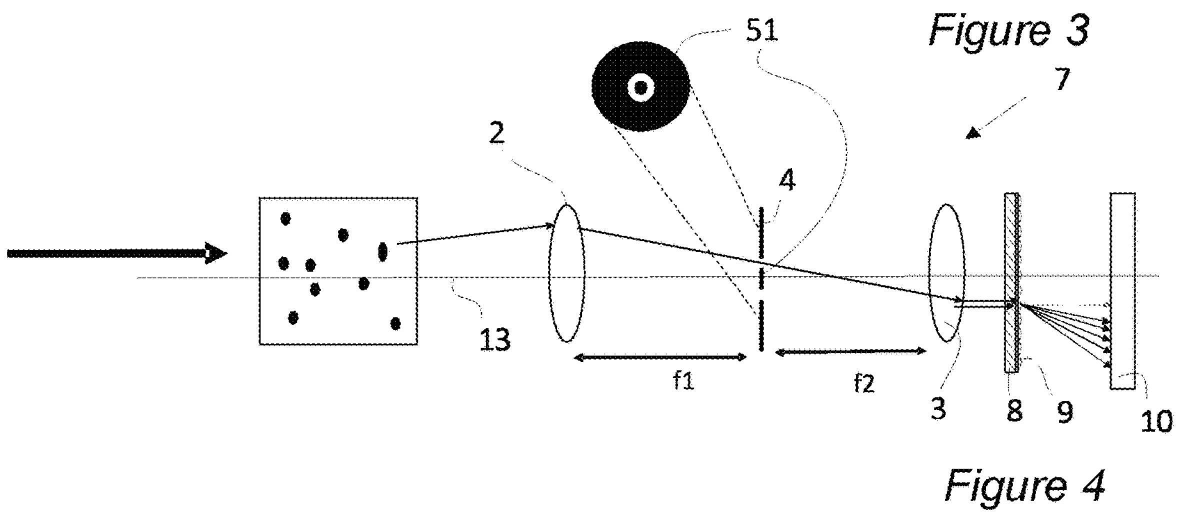
FIG. 4 shows a modified embodiment of the optical spectrometer of FIG. 2 where the light filter has a ring opening.

FIG. 4 discloses a further embodiment of the present disclosure where the light filter 4 has a ring opening 51, i.e. a hole with a blocked center part.

Figure 5:
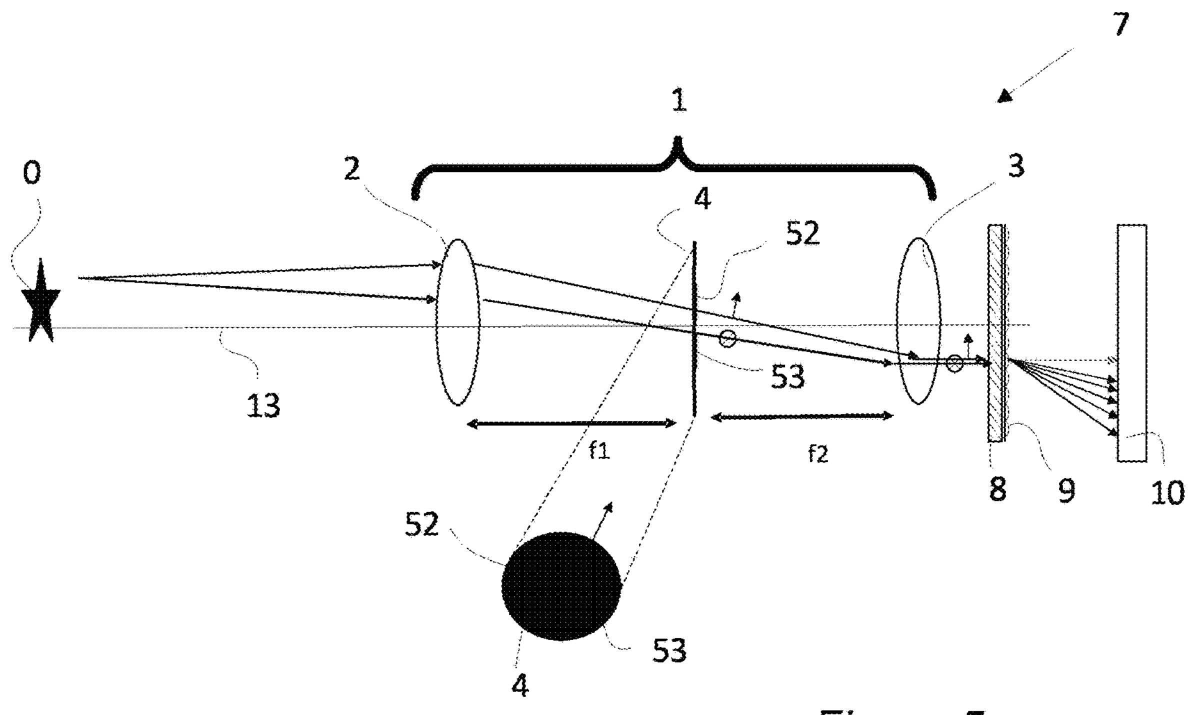
FIG. 5 shows a modified embodiment of the optical spectrometer of FIG. 2 where the light filter has two holes with a respective differently oriented polarizing filter.
Figure 6:
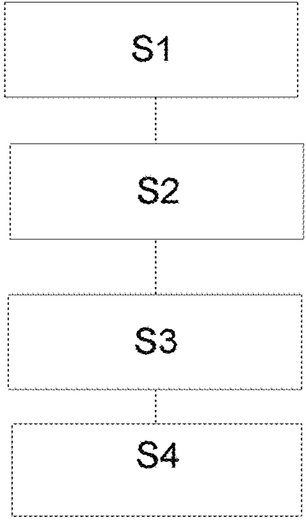
FIG. 6 is a block flow chart representing the method according to the present disclosure.

FIG. 5 discloses a further embodiment of the present disclosure where the light filter 4 has a first hole 52 and a second hole 53 close to the focal points of the first lens 2 and the second lens 3, wherein the first hole 52 hosts a first polarization filter 54 and the second hole 53 hosts a second polarization filter 55; wherein the direction of the first polarization filter 54 and the second polarization filter 55 are not equally aligned. The polarization of the radiation from the object 0 is thereby resolved in the collimated light exiting the lens assembly 1 that is thereafter imaged onto the a two-dimensional detector 10.

With reference to FIGS. 2-5 the first lens, the second lens or the third lens are of a type comprised in the group of: a simple lens, an achromatic doublet lens, an aspherical lens and a focusing lens assembly.

With reference to FIGS. 2-5 the second aspect of this disclosure shows an optical spectrometer the first aspect for spectrally resolved two-dimensional imaging of an object 0, comprising the lens assembly according to the first aspect, wherein the optical spectrometer further comprises: a dispersing device 8 placed after the lens assembly on the optical axis; a multi-lens array arrangement 9 arranged to receive the dispersed radiation from the dispersing device 8; and a two-dimensional detector 10 arranged to receive the dispersed radiation as directed by the multi-lens array arrangement 9. The multi-lens array arrangement 9 is a Shack-Hartmann micro-lens array, an achromatic multi-wave lateral shearing interferometer grating or any wavefront sensitive component. The two-dimensional detector 10 is typically a Charge Coupled Device (CCD) array, a Complementary Metal-Oxide-Semiconductor (CMOS) detector, an Indium Gallium Arsenide (InGaAs) detector or any other type of light sensitive detector.

The spectral resolution will now be discussed with some examples. Two wavelengths can be distinguished if their separation on the sensor is more than the point spread function of the micro-lens. The grating law for first order gives that, $$\sin(\alpha) = \lambda/a,$$

where a is the grating period.

The focal spot size is: $w_0=1.22*\lambda f/D$, where D is the microlens diameter.

Given that two wavelengths can be distinguished if $\Delta x$, the separation between these wavelengths at the sensor is larger than the focal spot size, i.e. $\Delta x>w_{0j}$. Therefore, two wavelengths can be distinguished if they are diffracted by the grating at angle of $\alpha$ and $\alpha'$ separated by, $$\alpha - \alpha' = w_0/f = 1.22 * \lambda/D \text{ and, } \alpha = \lambda/a.$$

For example, setting a=3.333 μm, λ=0.8 μm, f=3.7 mm, and D=300 μm we get a resolution of $\Delta\lambda = 1.22*\lambda\alpha/D = 11$ nm.

By the formula for the spectral resolution $\Delta\lambda = 1.22*\lambda a/D$ two options are available for increasing the resolution. Either the micro-lens diameter can be increased at the cost of a reduction of the spatial resolution, or the grating period a can be decreased, however optical aberrations in the lens quickly emerge and limits the possibilities. A further option is to use a grism, i.e. the combination of a prism and a grating.

The dispersing device 8 is a component comprised in the group consisting of a transmission grating, a holographic grating only transmitting the first diffraction order, and a grism.

The hole size of the light filter is such that the transmitted light is collimated within less than 10 milliradian The hole size of the light filter is such that the transmitted light is collimated within a few milliradian. This collimation is required so that the focus of each microlens is not significantly increased with respect to the focus of the same microlens illuminated by perfectly collimated light. For example a 100 micrometer (□m) lens of 1 millimeter (mm) focal length can focus down to 6.5 □m or 6.5 milliradian FWHM. Therefore the lens filter should filter to less than 6.5 milliradian in order not to affect the microlens focal spot size. For example if the lens 1 and 2 have a focal length of 5 cm then the hole diameter should be of less than 325 □m The dispersing device 8 and multi-lens array arrangement 9 are arranged directly adjacent or abutting to the second lens.

The lens diameter of the second lens is at least as large as the diameter of the detecting surface of the two-dimensional detector 10.

The third aspect of this disclosure shows a method for spectrally resolved two the first aspect dimensional imaging of an object 0, comprising the step of, S1 dispersing radiation from object 0 by a dispersing device 8, S2 receiving the dispersed radiation from the dispersing device 8 at a multi-lens array arrangement 9 arranged to, S3 receiving the dispersed radiation as directed by the multi-lens array arrangement 9 at a two-dimensional detector 10, wherein method further comprises the steps of S4 collimating the radiation from object 0 before the radiation reaches the dispersing device 8 by a lens assembly according to the first aspect.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. An optical spectrometer for spectrally resolved two-dimensional imaging of an object, comprising:

a lens assembly for collimating incoming radiation from an object arranged along an optical axis, comprising:

a first lens arranged on the optical axis of the lens assembly;

a second lens arranged on the optical axis of the lens assembly;

a light filter comprising a non-transparent sheet body with at least one hole;

wherein the light filter is arranged:

between the first lens and the second lens;

in the focal point of the first lens and the second lens; and so that the at least one hole is close to or at the optical axis of the lens assembly;

wherein the optical spectrometer further comprises:

a dispersing device placed after the lens assembly on the optical axis;

a multi-lens array arrangement arranged in one plane and arranged to receive the dispersed radiation from the dispersing device; and a two-dimensional detector arranged to receive the dispersed radiation as directed by the multi-lens array arrangement and located adjacent to the focus of each lens of the multi-lens array arrangement.

2. The optical spectrometer according to claim 1, further comprising a third lens placed on the optical axis before the first lens arranged to image an object in the focal spot of the first lens.

3. The optical spectrometer according to claim 1, wherein the light filter has a ring opening (a hole with a blocked center part).

4. The optical spectrometer according to claim 1, wherein the light filter has a first hole and a second hole close to the focal points of the first lens and the second lens, wherein the first hole hosts a first polarization filter and the second hole hosts a second polarization filter; wherein the direction of the first polarization filter and the second polarization filter are not equally aligned.

5. The optical spectrometer according to claim 1, wherein the first lens, the second lens or a third lens are of a type comprised in the group of: a simple lens, an achromatic doublet lens, an aspherical lens and a focusing lens assembly.

6. The optical spectrometer according to claim 1, wherein the dispersing device is a component comprised in the group consisting of a transmission grating, a holographic grating only transmitting the first diffraction order, and a prism.

7. The optical spectrometer according to claim 1, wherein the hole size of the light filter is such that the transmitted light is collimated within less than 10 milliradian.

8. The optical spectrometer according to claim 1, wherein the dispersing device and multi-lens array arrangement are arranged directly adjacent or abutting to the second lens.

9. The optical spectrometer according to claim 1, wherein the lens diameter of the second lens is at least as large as the diameter of the detecting surface of the two-dimensional detector.

10. A method for snapshot spatially resolved light analysis by an object, comprising the step of, dispersing radiation from object by a dispersing device, receiving the dispersed radiation from the dispersing device at a multi-lens array arrangement arranged to, receiving the dispersed radiation as directed by the multi-lens array arrangement at a two-dimensional detector, wherein method further comprises the steps of collimating the radiation from object before the radiation reaches the dispersing device by:

a lens assembly for collimating incoming radiation from an object arranged along an optical axis, comprising:

a first lens arranged on the optical axis of the lens assembly;

a second lens arranged on the optical axis of the lens assembly;

a light filter comprising a non-transparent sheet body with at least one hole;

wherein the light filter is arranged:

between the first lens and the second lens;

in the focal point of the first lens and the second lens; and so that the at least one hole is close to or at the optical axis of the lens assembly.

* * * * *